United States Patent
Gong et al.

(10) Patent No.: US 11,866,841 B1
(45) Date of Patent: Jan. 9, 2024

(54) ELECTRODEPOSITED MATERIALS AND RELATED METHODS

(71) Applicant: Seagate Technology LLC, Cupertino, CA (US)

(72) Inventors: Jie Gong, Eden Prairie, MN (US); Steven C. Riemer, Minneapolis, MN (US); Wei Tian, Eden Prairie, MN (US); Michael C. Kautzky, Eagan, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 135 days.

(21) Appl. No.: 15/922,312

(22) Filed: Mar. 15, 2018

(51) Int. Cl.
  *C25D 21/12* (2006.01)
  *G11B 5/31* (2006.01)
  *C25D 7/00* (2006.01)

(52) U.S. Cl.
  CPC .............. *C25D 21/12* (2013.01); *C25D 7/001* (2013.01); *G11B 5/3163* (2013.01)

(58) Field of Classification Search
  None
  See application file for complete search history.

(56) References Cited

U.S. PATENT DOCUMENTS

| | | | |
|---|---|---|---|
| 3,716,464 A * | 2/1973 | Kovac | C25D 5/18 205/259 |
| 4,279,707 A * | 7/1981 | Anderson | H01F 41/26 205/148 |
| 4,990,225 A | 2/1991 | Omata | |
| 6,287,476 B1 * | 9/2001 | Ju | B82Y 10/00 216/47 |
| 6,778,357 B2 | 8/2004 | Tabakovic et al. | |
| 8,755,149 B2 | 6/2014 | Song et al. | |
| 8,808,524 B2 | 8/2014 | Seets et al. | |
| 8,970,992 B2 | 3/2015 | Benakli et al. | |
| 9,005,420 B2 * | 4/2015 | Tomantschger | C25D 21/14 205/148 |
| 2002/0145824 A1 | 10/2002 | Tabakovic et al. | |
| 2004/0011432 A1 * | 1/2004 | Podlaha | C25D 3/562 148/336 |
| 2005/0219747 A1 * | 10/2005 | Hsu | G11B 5/3116 360/125.3 |
| 2009/0188805 A1 | 7/2009 | Moffat et al. | |
| 2011/0123783 A1 * | 5/2011 | Sherrer | H01F 41/14 428/195.1 |
| 2013/0186765 A1 | 7/2013 | Gong et al. | |

OTHER PUBLICATIONS

Akiyama et al. "Recent study on the mechanism of the electrodeposition of iron-group metal alloys" ISIJ International, vol. 32, 1992, No. 7, pp. 787-798 (Year: 1992).*

Giro et al., "Pulsed electrodeposition of high aspect-ratio NiFe assemblies and its influence on spatial alloy composition", Microsyst Technol, 14, p. 1111-1115, 2008. (Year: 2008).*

(Continued)

*Primary Examiner* — Stefanie S Wittenberg
(74) *Attorney, Agent, or Firm* — Kagan Binder, PLLC

(57) ABSTRACT

Described are electrodeposition methods, and materials and structures prepared by electrodeposition methods, and devices prepared from the electrodeposited materials.

18 Claims, 11 Drawing Sheets

(56) References Cited

OTHER PUBLICATIONS

Chang et al., "Electrodeposited High 4πMs CoFeCu For Thin Film Recording Heads" 1999 Electrochemical Society Proceedings vol. 98-20, p. 488-508. (Year: 1999).*
Andricacos et al., "Future directions in electroplated materials for thin-film recording heads", IBM J. Res. Develop. vol. 42, No. 5, Sep. 1998. (Year: 1998).*
Kanakaraj et al., "Effect of electrolytic bath temperature on magnetic and structural properties of electrodeposited NiFeW nano crystalline thin films", Oriental Journal of Chemistry, vol. 33, No. 6, p. 2899-2904, 2017. (Year: 2017).*
Lee et al., "Tailoring the magnetic properties of CoFeNi alloys with variations in copper contents", Journal of Applied Physics, 99, 08B704, 2006. (Year: 2006).*
Zhang et al., "Review of tools for friction stir welding and processing" Canadian Metallurgical Quarterly, vol. 51, No. 3 (2012) DOI 10.1179/1879139512Y.0000000015, pp. 250-261.

* cited by examiner

ELECTRODEPOSITED MATERIALS AND RELATED METHODS

FIELD OF THE INVENTION

The invention is in the field of electrodeposition methods, materials and structures prepared by electrodeposition methods, and devices prepared from the electrodeposited materials.

BACKGROUND

Electrodeposition methods, also known as "electroplating," are very well known, and are used to prepare a very large variety of items and devices for consumer and industrial purposes. Generally, electrodeposition methods involve submerging an item (a "workpiece") in a solution that contains dissolved electrolytes. A voltage is applied between the submerged workpiece and a separate electrode also in the electrolyte solution, to cause current to pass through the electrolyte solution and cause ionic species of the dissolved electrolyte solution to become deposited at the surface of the submerged item as an electrodeposited material.

In some applications the electrolyte solution contains a single type of ionic species to be deposited on the surface of the submerged item as a relatively pure material, such as a desired metal. In other many applications an electrolyte solution may contain multiple different ionic species that together become deposited as an alloy on the surface of the submerged item. In usual circumstances, when electrodepositing a pure material or an alloy, a goal is for the deposited material to be uniformly applied to the workpiece, including that the deposited material has a highly uniform composition over the surface of the item onto which the material is deposited.

Electrodeposition is a technique commonly used to prepare magnetic recording heads such as those used to read or write data onto magnetic recording media, such as those used in commercial hard disk drives. With ever-increasing needs for higher for high recording density in disk drives, with high levels of efficiency and reduced levels of failure, magnetic recording heads require correspondingly improved performance and reliability. Accordingly, continuing need exists to improve over past methods of electrodepositing materials onto components of magnetic recording heads.

SUMMARY

The following description relates to methods of electrodepositing a material (a "deposited material") onto a substrate to form a deposited structure. While the following description emphasizes example uses of the invention to deposit a magnetic material for use in read heads of a hard disk drive, the methods as described can be applied more generally, for electrodepositing any useful materials (magnetic, non-magnetic, etc.), for any purposes, onto various substrates, including but not limited to applications in the area of magnetic recording heads or devices.

The present invention involves the use of a species of an electrolyte solution that is a "diffusion-controlled species," and the phenomena of "diffusion-controlled deposition" of that species, to produce useful, desired, or advantageous electrodeposited materials. Normally or commonly, an electrodeposition process that operates in a "diffusion-controlled deposition" regime is disfavored because diffusion-controlled deposition can result in materials being electrodeposited onto a substrate with non-uniform composition over an area of a substrate. Applicant, however, has identified that diffusion-controlled deposition may be used advantageously useful to produce electrodeposited structures that are non-uniform in a desired, beneficial, or advantageous manner, to provide a useful, desired, advantageous, or beneficial effect.

Applicant has determined that methods of electrodeposition can be performed to deliberately allow or cause a species of an electrodeposition process to be one that is a diffusion-controlled species, and an electrodeposition method that involves a diffusion-controlled species can be performed to control amounts of the diffusion-controlled species that are incorporated into an electrodeposited structure, or portion of an electrodeposited structure. For example, concentrations of a diffusion-controlled species can be affected or controlled by factors that include: the size and shape features of an electrodeposited structure; the formulation of an electrolyte solution; or a feature of a mask used to form an electrodeposited structure.

Moreover, Applicant has identified that exercising control over an amount of diffusion-controlled species in a deposited structure or portion thereof advantageously allows for the related control of various properties of the structure that depend on and vary with the concentration of the diffusion-controlled species in the deposited structure. These properties can include general physical properties, mechanical properties, electrical properties (e.g., resistivity or conductivity), magnetic properties (e.g., coercivity, magnetostriction, anisotropy, damping, moment), optical properties, and other chemical and electrochemical properties—, among others.

Thus, when considered together, Applicant has successfully identified a method of selecting or controlling a physical feature or property of an electrodeposited structure or feature thereof, by performing electrodeposition in a regime that results is "diffusion-controlled" electrodeposition. The method can involve selecting a feature of an electrodeposition step or an electrodeposited structure that will result in diffusion-controlled deposition of a species in a deposited material, to form a deposited material (as a deposited structure or a portion thereof) that has a concentration of diffusion-controlled species that will cause the material to have a desired property. Applicant has identified that the phenomena of diffusion-controlled deposition allows for electrodeposition methods that can be performed to desirably control the concentration of a diffusion-controlled species in a deposited structure or in a portion of a deposited structure, and that the ability to control the concentration provides a method to control physical properties of the deposited structure.

In one aspect, the invention relates to a method of electrodepositing a deposited structure onto a substrate surface while controlling a concentration of a diffusion-controlled species in the deposited structure. The method includes: immersing the substrate in an electrolyte solution comprising one or more diffusion-controlled species and one or more non-diffusion-controlled species; and applying current to the substrate immersed in the electrolyte to cause the diffusion-controlled species and the non-diffusion-controlled species to form a deposited material on the substrate surface as a deposited structure having a concentration of the diffusion-controlled species that is affected by a dimension or shape of the structure.

In another aspect, the invention relates to a magnetic recording head comprising a magnetic component prepared by a method as described, including a deposited structure having a concentration of diffusion-controlled species that is affected by a dimension or shape of the magnetic recording component.

In another aspect the invention relates to an electrodeposited structure that includes electrodeposited material containing a first species present in a first concentration, and a second species present in second concentration that is lower than the first concentration. The second concentration varies over a surface of the electrodeposited structure.

DETAILED DESCRIPTION

Figure 1A:
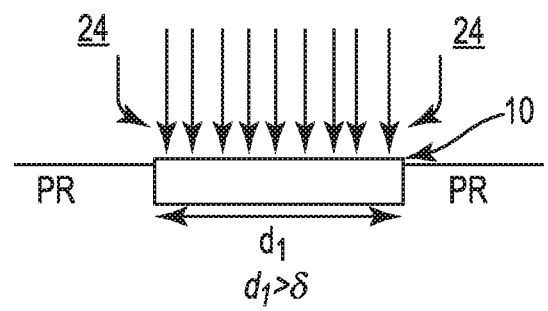
FIGS. 1A and 1B show examples of theoretical electrodeposition mechanisms as described herein.

The following description relates to methods and materials for electrodepositing (also known as "electroplating") a material onto a substrate. The deposited material contains a combination of materials, .e.g., is an alloy, with at least one of the species being present in the deposited material in a diffusion-controlled amount, i.e., a "diffusion-controlled species." Because deposition of the species occurs on a "diffusion-controlled" basis, the amount of the species contained in the deposited material can vary, and according to the present invention may advantageously be controlled, based on one or more features of the electrodeposition process or one or more features of the deposited structure. By controlling the amount of the species in the deposited material, a property or properties of the deposited material can also be selected and controlled, to produce a deposited structure having desired or advantageous properties.

In a process of electrodeposition, materials that are dissolved in an electrolyte solution are caused to be deposited onto a surface of a substrate placed in the solution by applying voltage to the surface, which attracts ions in the electrolyte solution to the surface, where the ions are incorporated into a solid layer of material. When the solution contains more than one species of dissolved electrolytes, the multiple species may be incorporated together into the deposited material, which is formed as an alloy. The concentration of the different species of an electroplated alloy can depend on various factors. One factor, but not the only or necessarily the dominant factor, is the concentration of a species in the electrolyte solution. Other factors that can have a significant effect include any feature of a process that affects the mobility (rate of transport, rate of diffusion) of an individual species within the electrolyte solution, or that affects the rate at which an individual species is incorporated into a deposited material upon becoming present at a location of deposition (i.e., after being transported to the surface of the substrate where deposition occurs). Some other examples may include: the current level and current density at a substrate surface, the presence or amount of movement (e.g., agitation) of the electrolyte solution at a surface of the substrate, and the size or shape features of a structure of material being deposited.

When a species is present in an electrolyte solution in a low amount, factors that have a significant effect on the amount (concentration) of that species that becomes incorporated into the deposited material include those that affect the rate at which that species is transported from the electrolyte solution to a location at the substrate surface at which the species will be become incorporated into a deposited material. The concentration of that particular species (present at the low level) in the deposited material will, to a significant degree, be affected by, e.g., slowed down by, the rate at which the species is transported from the bulk electrolyte solution to the surface of material being deposited.

As a general matter, the rate of deposition of a dissolved species at a location of the material being deposited onto a substrate is rapid, once each molecule of the species reaches the location of deposition. Accordingly, if the concentration of a species in the electrolyte solution is sufficiently high, so that the rate of deposition is not affected by a rate of transport of a species within an electrolyte solution, a deposition rate-limiting factor is the rate at which the species can become incorporated into the deposited material.

If, however, the concentration of a species in an electrolyte solution is sufficiently low, the rate of transport of the material from the bulk electrolyte solution to the location of the material being deposited can become a limiting factor in the amount of the species that becomes incorporated into the deposited material. In specific, it is possible that a rate of transport, or diffusion, of a dissolved species present in an electrolyte solution at low concentration becomes a limiting factor in the rate of deposition of that species, causing a reduced concentration of that species in the deposited material. Such a species present in an electrolyte solution, or in a deposited material, is referred to herein as a "diffusion-controlled species."

An electrodeposited material (a.k.a. "deposited material" for short) of the present description can be in the form of any structure, layer, or feature that is formed by an electrodeposition technique onto a substrate. While the deposited material may either be magnetic or non-magnetic, example methods described herein relate to depositing various useful magnetic materials onto a surface of a substrate to form a magnetic structure on the surface. Example magnetic materials include any type of magnetic material that has magnetic properties that are useful in a structure or feature of a structure of a microelectronic device, a microelectromechanical system or device (e.g., a MEMS device), or another microscale or nanoscale structure prepared by electrodeposition, such as a shield or other component of a magnetic read head for a magnetic recording device.

A deposited structure may be in the form of material electrodeposited onto a substrate in the form of a thin layer of deposited material having a shape and form in three dimensions. Examples of such layers can be in the form of a continuous flat film applied to a planar or flat portion of a substrate extending to a substantial degree in two dimensions, i.e., in an x-direction and a y-direction, i.e., having a "width" and a "length," and having a thickness (in a z-direction) that is relatively uniform across the structure, that is flat or planar, and that is less than or substantially less than one or both of the dimensions of the layer in the x- and y-directions.

Other examples of deposited structures can be formed onto a surface of a substrate that is not flat and planar but that has a three-dimensional form that includes one or more bumps, protuberances, or projections extending in and having a dimension in a z-direction. A deposited material formed on a substrate surface that has a three-dimensional structure may typically extend over and cover the three-dimensional form of the structure by adapting to and also covering any non-flat portions of that three-dimensional structure.

Any type of deposited structure, flat or three-dimensional, can be formed by assistance of a mask, e.g., a photoresist mask, which can be placed on a surface of a substrate, with the mask including openings that define a shape, dimensions, and a general and specific form of a deposited structure in length and width dimensions. The thickness (depth, in the z-direction) of the mask and the amount of material deposited affect the thickness of the deposited structure. During electrodeposition, the deposited material fills openings in the mask to form individual deposited structures on the substrate, each having the shape of the opening, and each having a thickness that is substantially the same as, or in a range of, the thickness of the mask. To the extent that the substrate surface includes three-dimensional features on the surface, within an opening, the deposited material covers the three-dimensional feature and conforms to the shape of the three-dimensional feature.

A deposited structure formed by a mask can have a two-dimensional (length and width) shape or form that may be either simple or complex, or that can include a combination of simple and complex features. The two-dimensional form (dimensions in the x-y plane, disregarding thickness) may be, or may include, any one or more simple geometric shapes such as a circle, square, triangle, rectangle, line, oval, etc. Other structures may be more complicated or varied in dimension over an x-y plane, and may include portions (features) that have a combination of larger and smaller widths, larger and smaller lengths, or both. Examples of certain specific deposited structures with which the present invention is considered to be useful include various structures or elements of magnetic recording heads, for example, shields, poles, etc., of a magnetic recording head such as those that are presently used in commercial hard disk drives. For functional reasons, these structures are typically of a relatively complex two-dimensional form, such as by including a varied width along a length of the structure.

As presented in the present description, Applicant has identified that the phenomena of diffusion-controlled deposition can be caused to occur, with intent and control, in a manner that desirably and advantageously provides a desired composition of, and therefore desired properties of, a deposited material, a deposited structure, or a portion of a deposited structure. Previously, the occurrence and effects of diffusion-controlled deposition have been understood and expected to be detrimental to an electrodeposited material or structure, as causing non-uniformity of a deposited material or structure. For this reason, the occurrence of diffusion-controlled deposition has been desirably avoided, in favor of uniform deposition that occurs based on non-diffusion-controlled electrodeposition. Past electrodeposition processes have been designed and performed in a way to preferably cause deposited materials to be applied by electrodeposition to have a uniform composition over a full extent of a deposited structure, for example without variation over an area of an individual deposited structure (i.e., without intra-structure variation), and without variation between multiple structures (similar, different, or the same) formed on a single wafer (i.e., intra-wafer variation), or multiple structure formed on different wafers but using the same or an identical electrodeposition process and conditions.

As presented, Applicant has determined that methods of electrodeposition—instead of being designed to prevent and to avoid diffusion-controlled deposition—may be designed and performed to intentionally cause and allow for controlled diffusion-controlled deposition. Electrodeposition may be performed in a way to intentionally allow for or cause a species of an electrodeposition process to be one that is a diffusion-controlled species. Intentional use of diffusion-controlled electrodeposition has been identified by Applicant to allow for control of an amount of the diffusion-controlled species that becomes incorporated into a deposited structure, or into a portion of a deposited structure, by controlling a feature of the electrodeposition method or a feature of a deposited structure. Additionally, the ability to control the amount (concentration) of the diffusion-controlled species in the deposited structure, or portion thereof, has been identified by Applicant as useful to affect various properties of the deposited material that depend on the composition of the material. These properties may include one or more physical properties, mechanical properties, electrical properties (e.g., resistivity or conductivity), magnetic properties (e.g., coercivity, magnetostriction, anisotropy, damping, moment), optical properties, or the like, of a deposited structure or a portion (feature) of a single deposited structure.

As an example of an advantageous use of diffusion-controlled deposition as described, diffusion-controlled electrodeposition may be used to produce individual deposited structures that include different concentrations of a diffusion-controlled species at different portions (features) of the individual deposited structure; diffusion-controlled deposition can be used to produce a single structure, e.g., a complex structure, that has different concentrations of a diffusion-controlled species at different portions (features) of the single deposited structure, i.e., the use of diffusion-controlled deposition allows one to design and achieve intra-structure variability of the concentration of a diffusion controlled species. The ability to control the concentration of a diffusion-controlled species at different features of a deposited structure allows one to consequently produce an individual structure that has one or more desired or selected properties at the different features of the structure, based on the varied concentration of the diffusion-controlled species at different features of the structure.

Alternately, another advantageous use of diffusion-controlled deposition may be to produce a group or collection of deposited structures on a single substrate or on different substrates, with individual structures of the group or collection of structures having different concentrations of a diffusion-controlled species. The use of diffusion-controlled deposition allows one to designed and achieve inter-structure variability of the concentration of a diffusion controlled species in different structures that may be present on a single substrate (e.g., wafer) (i.e., intra-wafer variability), or that may be on different substrates that are processed by an identical electrodeposition method. The ability to control the concentration of a diffusion-controlled species as part of different structures on a single wafer, or on different wafers, allows one to, consequently, produce multiple structures having varied properties.

Thus, the invention relates to Applicant's understanding that: when electrodepositing multiple species from an electrolyte solution, with the deposition rate of one species is controlled by diffusion of the species within the bulk electrolyte solution, the concentration of that species in a deposited material can be affected and controlled; that the resultant concentration can affect useful properties of the deposited material; and that one or a combination of a process feature, electrolyte formulation, feature (size or shape) of a deposited structure, or mask feature, can be selected to achieve desired control of the concentration of the diffusion-controlled species, to thereby affect or control desired property of the deposited material.

By certain presently useful examples of methods and structures of the present description, when performing electrodeposition in a diffusion-controlled regime, i.e., with a diffusion-controlled species, an amount, e.g., concentration, of diffusion-controlled species in a deposited structure, or in a portion of a deposited structure, can be affected (e.g., controlled or selected) by selecting a size or shape feature of the deposited structure. Stated differently, when a species of an electrolyte solution is a diffusion-controlled species, a concentration of the diffusion-controlled species that become present in a deposited structure can be affected, by, e.g., controlled by, a size or shape feature of the structure. A "size or shape feature" is a size or shape of a deposited structure or a portion of a deposited structure, such as a dimension (e.g., "length," "width," or "height" (meaning thickness or depth), or is a shape of a structure in two-dimensions or in three-dimensions.

As presented herein, Applicant has identified that size and shape features of a deposited structure (among other features of an electrodeposition process) can have an effect on the amount of (e.g., concentration of) a diffusion-controlled species that will be present in the deposited structure, including in various portion of the deposited structure, that is formed when the structure is formed on a substrate by electrodepositing from an electrolyte solution that contains the diffusion-controlled species.

With respect to a size feature that is a dimension in an x-y plane of a deposited structure, the concentration of diffusion-controlled species that will become incorporated into a deposited material can relate to what is referred to herein as a "critical dimension" of the structure at a location of deposition with respect to the x-y plane. At a sufficiently small scale (e.g., at dimensions of microns or nanometers), and depending on the amount of agitation in an electrodeposition bath, current density, and other features of an electrodeposition process, a dimension between edges of a deposited structure can be sufficiently small, with the edges being sufficiently near each other, to affect the size (e.g., thickness) and shape of a diffusion layer that forms between a surface of the structure and the bulk electrolyte solution during formation of the deposited structure by electrodeposition.

One example of a critical dimension is a dimension (distance) between two edges of a structure that, if sufficiently small, will result in non-linear diffusion of a diffusion-controlled species from a bulk electrolyte solution to a location of deposition of the species as deposited material on a substrate surface. Non-linear diffusion, in a diffusion-controlled regime, will result in a higher concentration of diffusion-controlled species being present in a deposited material, relative to the concentration that would be present if the diffusion were linear diffusion. A critical dimension may be affected by various factors including the amount of agitation present in an electrodeposition bath, current density of an electrodeposition process, among others. An increased amount of agitation will reduce a thickness of a diffusion layer present between a bulk electrolyte solution and a location of deposition, and a critical dimension at which non-linear diffusion occurs will be smaller relative to the same system with a relatively lower amount of agitation.

Current density of an electrodeposition process can also affect the concentration of a diffusion-controlled species in a deposited material, the concentration also being affected by a dimension of a deposited structure. Electrodeposition that is performed at a higher current density can the deposition more "diffusion-controlled", which will reduce the size of a dimension of a structure (e.g., length or width) that will result in non-linear diffusion. For a given dimension, diffusion at a relatively lower current density may be linear, while an increased current density may result in non-linear diffusion.

According to an example of a method of the present description, a size feature (e.g., dimension) of a deposited structure having either a complex or a simple two-dimensional form in an x-y plane can be used to control or adjust a concentration of a diffusion-controlled species in the deposited structure or in a portion or feature thereof. For a structure having a simple two-dimensional form such as a circle, square, rectangle, triangle, oval, or other simple geometric form, a dimension in an x-direction or in a y-direction can affect the concentration of diffusion-controlled species in material that is deposited using electrodeposition, by affecting the thickness or shape of a diffusion layer on a surface of the structure during formation. With features of sufficiently small size in at least one direction in an x-y plane (e.g., on a micron or nanometer scale), a relatively larger feature size will result in more linear diffusion of the diffusion-controlled species and a lower concentration of the diffusion-controlled species in the deposited material, and a relatively smaller dimension of a feature will result more non-linear diffusion and a higher concentration of the diffusion-controlled species in the deposited material.

For a circle or circular form of a deposited structure, a diameter will affect the concentration of diffusion-controlled species in the deposited structure, if sufficiently small to cause non-linear diffusion of the diffusion-controlled species. A structure having a circular shape, having a relatively larger diameter, that is formed by linear diffusion of diffusion-controlled species, will have a lower concentration of diffusion-controlled species relative to a circular structure having a smaller diameter that is formed by non-linear diffusion of the diffusion-controlled species.

For a square, rectangle, or line having sufficiently small dimension, e.g., a width of a line that is substantially smaller than a length, the width can affect whether diffusion through a diffusion layer is linear or non-linear, and will thereby affect the concentration of a diffusion-controlled species in an electrodeposited structure. In an electrodeposition process that can produce either linear and non-linear diffusion depending on dimensions of a deposited structure, such as for a line or rectangle having a given (relatively large) length, a deposited line or rectangle having a relatively larger width may be deposited by linear or relatively linear diffusion and will have a lower concentration of diffusion-controlled species, compared to a deposited line or rectangle having a relatively smaller width formed by diffusion that is relatively more non-linear. For these and other relatively simple geometric forms, a method of the present description can include selecting a dimension, e.g., a diameter or a width, of a deposited structure that (with other useful processing conditions, a useful substrate, and a useful electrolyte solution) will result in diffusion of a desired nature, e.g., linear, non-linear, or a desired degree of non-linear diffusion, to provide a desired concentration of diffusion-controlled species in the deposited structure.

In carrying out a method as presently described, a substrate is presented to an electrolyte solution of an electrodeposition process. The electrolyte solution contains dissolved (e.g., ionic) species that, during electrodeposition, become formed into a deposited material on a surface of the substrate. The solution can contain multiple dissolved species including one or more species that is diffusion-controlled, and at least one, optionally more, species that are non-diffusion limited. A voltage is established at the substrate to cause current to pass through the electrolyte solution, which causes dissolved ion species of the electrolyte to become deposited at the surface of the substrate. As desired, the current may be pulsed, or may be steady.

The dissolved chemical species in the electrolyte solution may be any species of dissolved material that is desirably deposited onto a substrate as part of a deposited material. Examples include metals, which may be electrically conductive and optionally either magnetic or non-magnetic when formed into a deposited material. These metal material species may often be present in an electrolyte solution in a concentration that does not result in diffusion-controlled deposition of the metal material. Examples of metal species that may be present in an electrolyte solution in a non-diffusion-controlled amount, and that form a deposited material that is magnetic, include iron, cobalt, and nickel. Other metal species may also be used as a non-diffusion-controlled species depending on the desired features and properties of a deposited material, deposited structure, or portion of a deposited structure. A diffusion-controlled species can be any additive species (a.k.a., "dopant" species) that may be included in a deposited material for a purpose of affecting one or more properties of the deposited material in a desired and controlled manner, when present at a relatively low concentration in the deposited material. An additive or dopant species can be any species that is desirably incorporated into a deposited material that includes a high amount of one or more non-diffusion-controlled species, e.g., a magnetic or non-magnetic metal, with the additive species being present at a relatively low amount (concentration) relative to other species, and with the additive species being included in the deposited material for a purpose of affecting a property of the deposited material, such as a physical property, mechanical property, electrical property (e.g., resistivity or conductivity), magnetic property (e.g., coercivity, magnetostriction, anisotropy, damping, moment), etc. Also as described, the additive species can be a diffusion-controlled species and the concentration of the additive species that becomes part of a deposited material can be affected or controlled (e.g., by control of a shape or size feature, e.g., a dimension, of a deposited structure) to provide a higher or lower level of a desired property (physical property, electrical property, magnetic property, etc.) exhibited by the deposited material, a deposited structure, or a portion (e.g., feature) of a deposited structure.

Examples of species that may be included in a deposited material (e.g., a metal or a magnetic material) in a low amount as an additive, and as a diffusion-controlled species, to affect a property of the deposited material, include: Re, Ir, Os, Pt, W, Ta, Rh, Au, Ag, Cu, Pd, Ru, S, Sb, Sn, P, O, etc.), as well as iron (Fe). Other species may also be used as a diffusion-controlled species, depending on a desired feature or property of a deposited material, deposited structure, or portion of a deposited structure.

Examples of deposited materials as described include alloys that may be magnetic or non-magnetic metal alloys, that contain one or more non-diffusion-controlled species along with one or more diffusion-controlled species. According to presently-understood and useful methods and deposited materials, example deposited materials include alloys having elements of a ternary or quaternary magnetic alloy. Specific examples of alloys include NiFeX, CoFeX, CoFeNiX, CoFeXY, NiFeXY, wherein nickel, iron, cobalt, or combinations of these, are individually present in the alloy as non-diffusion-controlled species, and the X, Y, or X and Y species are present as additives as diffusion-controlled species in the deposited material. In another example the alloy may be NiFeO, with iron being present as a diffusion-controlled species. For these alloys, each of the metal constituents is present in a stable concentration, and a concentration of a diffusion-controlled or a non-diffusion-controlled species as described herein.

An amount of a diffusion-controlled species (additive or dopant) in a deposited material can be any amount that will affect a property of the deposited material in a desired way. Example concentrations of a diffusion-controlled species in a deposited material may be in a range from 1 to 5, 10, 20, 25, or 30 atomic percent.

As part of an electrolyte solution, a non-diffusion-controlled species can be present at any concentration that will allow the species to be deposited onto a substrate surface in a non-diffusion-controlled manner, i.e., at a rate that is dominated by the rate at which the species becomes incorporated into a deposited material at a location of deposition, and not a rate that is dominated by (and slowed down by) the rate at which the species is transported from a bulk portion of the electrolyte to the location of deposition at a substrate surface. Example concentrations of a non-diffusion-controlled species in an electrolyte solution of an electrodeposition process, without being limiting, can be at a concentration that is at least 0.01 molar e.g., from 0.02 or 0.05 to 1.0 molar, such as from 0.1 to 0.8 molar.

A useful concentration of a diffusion-controlled species in an electrolyte solution can be any concentration that will allow the species to be deposited onto a substrate surface in a diffusion-controlled manner, i.e., at a rate that is dominated not by the rate at which the species becomes incorporated into a deposited material at a location of deposition, but by the rate that that species is transported from a bulk portion of an electrolyte solution, through a diffusion layer, to the location of deposition at a substrate surface. Example concentrations of a diffusion-controlled species, without being limiting, can be in a range up to about 10 millimolar (mM), e.g. from 0.001 to 5 mM such as from 0.01 mM to 5 mM or from mM to 1 mM.

Within useful ranges of concentrations of diffusion-controlled species in an electrolyte solution, the concentration of any particular diffusion-controlled species in an electrolyte solution can be selected, along with other features of an electrodeposition process and deposited structure, to produce a deposited material or a portion of a deposited material that forms a deposited structure that includes a controlled and desired concentration of the diffusion-controlled species. The controlled concentration can be one that is useful, desired, or advantageous, by providing one or more desired properties of the deposited material such as one or more physical properties, mechanical properties, electrical properties (e.g., resistivity or conductivity), magnetic properties (e.g., coercivity, magnetostriction, anisotropy, damping, moment), optical properties, and other chemical and electrochemical properties, or the like, of a deposited material or a deposited structure.

Figure 1B:
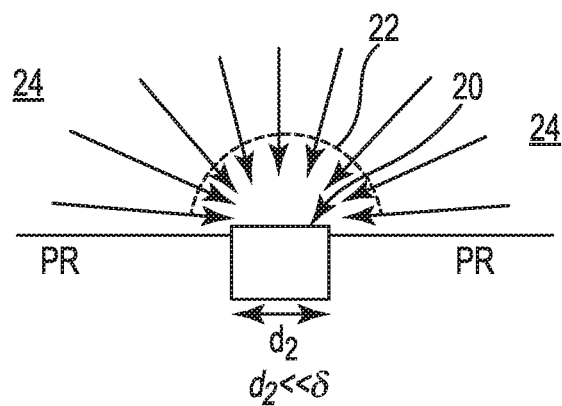

Referring to FIGS. 1A and 1B, two different examples of deposited structures are shown in cross section. The two structures can be used to illustrate a specific application of the presently-described methods, which is to affect, e.g., selectively control or "tune," a concentration of diffusion-controlled species in a deposited structure based on the nature of diffusion (linear or non-linear) of the diffusion-controlled species that occurs during electrodeposition, which can in turn be affected by a size feature of a deposited structure.

Deposited structure 10 of FIG. 1A, which may be magnetic or non-magnetic, has a size feature of a width d1 (for example in an x-direction) that is smaller than or substantially smaller than a length (not shown, e.g., in a y-direction) of the structure 10. Structure 10 also has a thickness in the z-direction.

At FIG. 1B, deposited structure 20, of the same deposited material as structure 10, includes a size feature of width d2, that is also smaller than or substantially smaller than a length (not shown) of structure 10. Structure 20 also has a thickness in the z-direction. Width d1 of structure 10 is larger than width d2 of structure 20, which, at levels of micron or sub-micron dimensions, will result in the concentration of a diffusion-controlled species in the deposited material of structure 20 being higher than the concentration of the same diffusion-controlled species in the deposited material of structure 10, if both structures 10 and 20 are deposited by same or identical electrodeposition processes, e.g., if structure and structure 20 are located on a surface of one single wafer during electrodeposition, or if structure and structure 20 are located on surfaces of different wafers that are both subjected to an identical electrodeposition process.

Without being bound by theory, during electrodeposition of structure 10, diffusion-controlled species X is transported from bulk electrolyte solution 24 to a location of deposition on structure 10, while structure 10 is formed by electrodeposition. That transport of diffusion-controlled species X includes transport through a diffusion layer (not shown) of electrolyte solution that is present over the top surface of structure 10 during electrodeposition. The thickness and form of the diffusion layer are affected by factors of an electrodeposition process such as the degree of agitation of electrolyte solution in an electrodeposition bath. An example thickness ($\delta$) of a diffusion layer may be on a scale of single-digit microns, such as from about 1 to about 10 microns. Because the length and width (d1) dimensions of structure 10 are sufficiently large, the diffusion layer is of substantially uniform depth across its length and width, i.e., is substantially flat or planar, which results in linear diffusion of diffusion-controlled species X through the diffusion layer over the surface of structure 10 during deposition. Additionally, structure 10 has a width d1 that is substantially greater than the thickness of the diffusion layer, e.g., a width that is on a scale of tens of microns, such as from 20 to 200 microns, or from 50 to 150 microns. During electrodeposition of structure 10, the magnitude of width d1 is greater than the depth or "thickness" ($\delta$) of the diffusion layer. This difference in the relative size of the width d1 and the depth of the diffusion layer results in a relatively planar diffusion layer of uniform thickness across the area of structure 10 during formation, and, consequently, substantially linear diffusion (represented by the vertical arrows) of the diffusion-controlled species through the diffusion layer, over the area of structure during formation of structure 10 during electrodeposition.

In contrast, referring to FIG. 1B, during electrodeposition of structure 20, diffusion-controlled species X becomes part of a deposited material of deposited structure 20 as species X is deposited by a mechanism that involves non-linear diffusion, e.g., spherical diffusion (represented by the arrows). A diffusion layer having an estimated boundary represented by dashed lines 22 is present, which may have a thickness on a scale of single-digit microns, such as from 1 to 50 microns, or from 30 to 50 microns, but that is not uniform over the surface of structure 20 as structure 20 is being formed. The non-planar diffusion layer results in non-linear diffusion of diffusion-controlled species X from a bulk electrolyte solution 24, through the diffusion layer, and to a location of deposition and formation of structure 20 by electrodeposition.

Structure 20 of FIG. 1B has a size feature of a width that is not substantially larger than the thickness ($\delta$) of the diffusion layer; e.g., the width may be about the same as or less than the thickness ($\delta$) of the diffusion layer; the width may be on a scale of tens of microns, such as from 0.1 to 5 microns. During electrodeposition of structure 20, the magnitude of width d2, being not substantially greater than the thickness ($\delta$) of the diffusion layer, results in a non-flat, non-planar diffusion layer (e.g., a rounded or hemi-spherical diffusion layer having boundary 22, as illustrated). The non-planar diffusion layer causes nonlinear diffusion, e.g., spherical diffusion, of the diffusion-controlled species through the diffusion layer over the area of structure 20. The spherical diffusion results in a higher concentration of the diffusion-controlled species X being incorporated into deposited material of structure 20 relative to a concentration that would occur by linear diffusion. Generally, non-linear diffusion (e.g., spherical diffusion) of a diffusion-controlled species through a diffusion layer from a bulk electrolyte to a location of formation of a deposited material causes in an increased concentration of the diffusion-controlled species in the deposited material relative to a concentration that would result by linear diffusion.

The diffusion layers of electrodeposition steps shown at FIGS. 1A and 1B can also be affected by charge density of the electrodeposition step. For a given dimension of a deposited structure (e.g., thickness ($\delta$)), diffusion of a diffusion-limited species through the diffusion layer may be linear at a relatively lower current density, while an increased current density may produce non-linear diffusion. Based on modeling, an increase in a current density of from 2 to 10 times, may allow a dimension at which non-linear diffusion occurs to be reduced several times, e.g., from about 40 microns to about or to less than 1 micron.

Figure 2A:
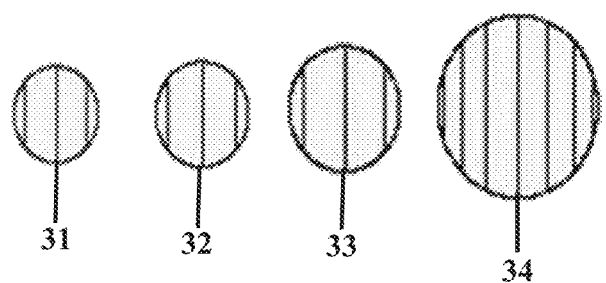
FIGS. 2A and 2B show examples of deposited structures and representative, approximate concentration data.
Figure 2B:
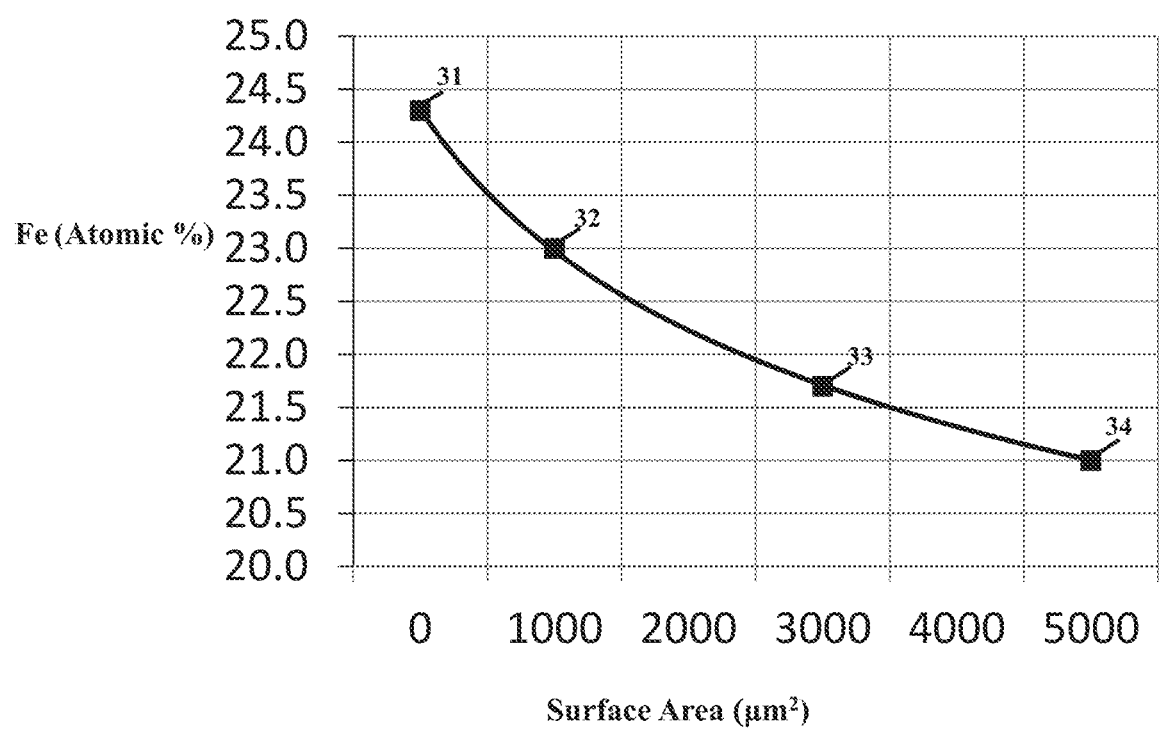

Referring now to FIGS. 2A and 2B, illustrated are examples of the use of a size feature of a deposited structure to control the composition of deposited material of a deposited structure or a feature thereof on an intra-wafer basis. At FIG. 2A, examples of four circular deposited structures are shown as deposited on a surface of a single substrate (e.g., wafer, not shown) in an x-y plane. The structures are made of NiFeO alloy. The circular structures have various diameters, successively increasing for each of structures 31, 32, 33, and 34, with surface areas that range between about 300 to under about 5000 square microns. See the table of FIG. 2B. The structures were formed on a single substrate surface, through a mask, by electrodeposition using an electrolyte solution with the following composition.

| Chemical | Units | Concentration |
| --- | --- | --- |
| $NH_4Cl$ | M | 0.2-0.4 |
| $H_3BO_3$ | M | 0.2-0.6 |
| $Ni_2^+$ salt | M | 0.03-0.06 |
| $Fe_2^+$ salt$^+$ | mM | 4-8 |
| NSA-1 additive | g/l | 0-1 |
| SLS ($C_{12}H_{25}SO_4Na$) | g/l | 0-0.1 |
| pH 2-4 | | |
| Current density (mA/cm$^2$) = 5-50 | | |

Nickel ion is present in a non-diffusion-controlled amount, and iron ion is present in a diffusion-controlled amount.

As shown at FIG. 2B, the concentrations of iron, a diffusion-controlled species, in the deposited materials of the deposited structures having larger diameters is significantly lower than the concentrations of iron in the deposited materials of the deposited structures having smaller diameters. This indicates that diffusion layers that were present during electrodeposition at surfaces of the structures with larger diameters were linear or were more linear (less rounded) as compared to the diffusion layers present at surfaces of the structures with smaller diameters; the diffusion layers present at the surfaces of the smaller structures were relatively less linear and relatively more rounded or spherical. According to the particular deposited materials of FIGS. 2A and 2B, the concentration of diffusion-controlled species iron can be controlled, based on feature size (diameter), within a range between about 20 and about 25 atomic percent. Properties of the deposited structures such as magnetostriction and anisotropy, will differ based on the concentration of the iron, and can be controlled based on selected feature size of the deposited structure. Note that the data of FIG. 2B is approximate, and is provided to show at least a qualitative relationship between a size or shape feature of a deposited material, and concentration of a diffusion-controlled species.

Figure 3A:
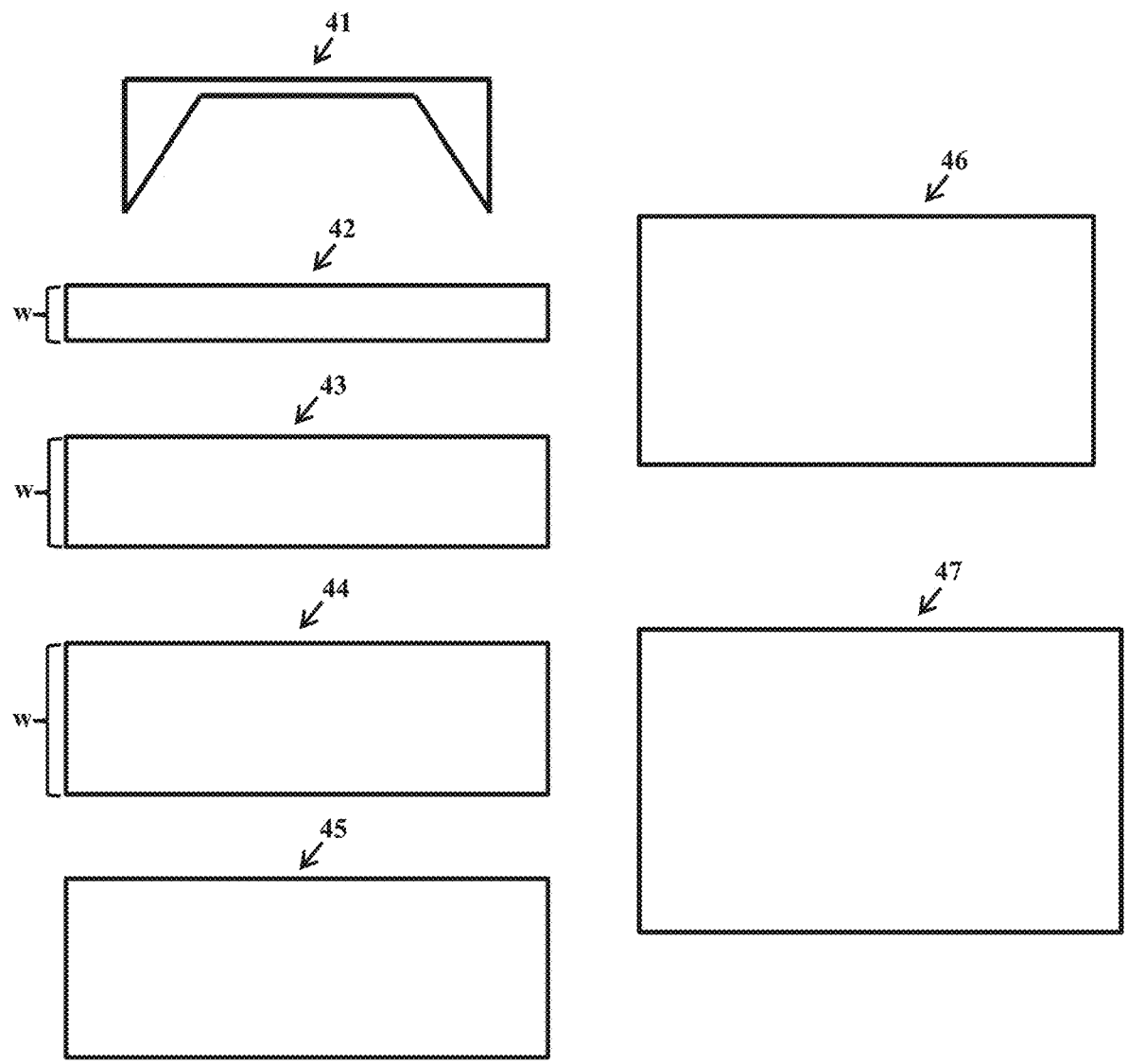
FIGS. 3A and 3B show examples of deposited structures and representative, approximate concentration data.
Figure 3B:
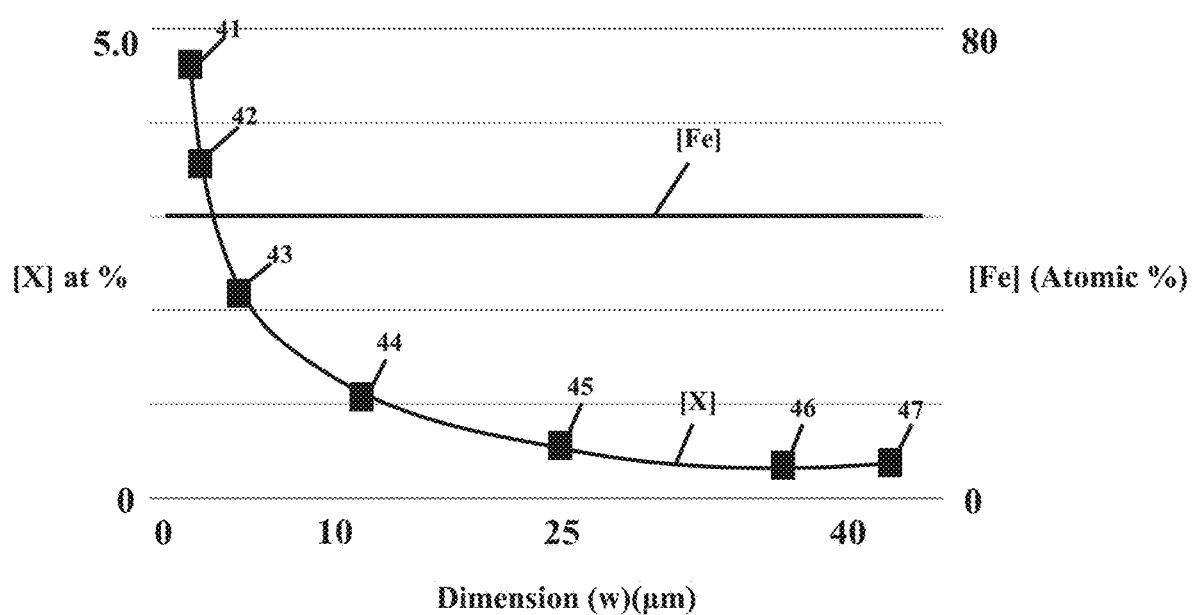

Referring to FIGS. 3A and 3B, these illustrate the use of feature size and feature shape of a deposited structure to control the composition (and thereby, properties) of different features of an individual deposited structure, including control of a local composition of a specific feature or portion of a larger structure, i.e., control of intra-structure composition, by controlling deposition of a diffusion-controlled species (X, e.g., Re) based on feature size. Examples of relatively simple geometric deposited structures (e.g., a narrow portion 41 of an irregular-shaped structure, and rectangular structures 42, 43, 44, 45, 46, 47 (which may be a portion of a larger structure)) having successively increasing widths, are illustrated as deposited on a surface of a single substrate (e.g., wafer, not shown) in an x-y plane.

The deposited structures are made of NiFeX alloy (e.g., X can be Re), are flat, and have various size features (dimensions in the x-y plane), as well as a thickness (in the z-direction). The structures were formed on a single substrate surface, through a mask, by electrodeposition using an electrolyte solution with the composition shown directly below. The electrodeposition process included pulsed current as indicated below as time on (ton) and time off (toff) in milliseconds.

| Chemical | Units | Concentration value |
| --- | --- | --- |
| $H_3BO_3$ | M | 0.15-0.6 |
| $Ni_2^+$ | M | 0.18-0.36 |
| $Fe_2^+$ | M | 0.15-0.03 |
| X-element (e.g., Re) | mM | 0.2-0.4 |
| pH 2-3 | | |
| Current density mA/cm$^2$ | 15-45 | |
| ton (ms) | 10-400 | |
| toff (ms) | 20-1000 | |
| Composition $(Ni_{70-15}Fe_{30-85})_{87-99}X_{1-13}$ | | |

Non-diffusion-controlled species are the Ni 2+, and Fe 2+, each of which is independently present in the electrolyte solution at a concentration of at least 0.1 M. The X element, e.g., Re, is present in a diffusion-controlled amount.

As shown in an qualitative manner at FIG. 3B, the concentration of the X-element (e.g., Re) in various structures or features is different between different structures, i.e., varies based on form (shape and size) of s deposited structure. The concentration of the X-element between different structures and between different portions (features) of a single structure may be diffusion-controlled, and varies and is affected by the dimension of a structure or feature. The concentrations of X-element (e.g., Re) in the deposited materials of the deposited structures (or specific features of a deposited structure) that have smaller dimensions are significantly larger than the concentrations of the X-element in the deposited materials of the deposited structures (or specific features) that have larger dimensions, indicating that the deposited structures with higher concentrations and a smaller dimension were formed by non-linear diffusion. The concentration of the X-element can, therefore, be controlled over a range of concentrations (such as from below 1 atomic percent for feature 47, and about 4.5 or 5 atomic percent for feature/location 41), as desired, based on a size or shape feature of a deposited structure, to provide a desired concentration of a diffusion-controlled species in a structure or a feature of a structure. Controlling the concentration of the diffusion-controlled species can allow for control of a desired property (e.g., damping or moment) of the structure or feature. Note that the data of FIG. 3B is approximate and qualitative, and is provided to show a qualitative relationship between size or shape features of a deposited material and concentrations of diffusion-controlled and non-diffusion-controlled species in the deposited material.

Also shown (at least qualitatively and approximately) at FIG. 3B, the concentration of non-diffusion-controlled species Fe is substantially independent of the size or shape of the deposited structure, and is substantially uniform over the deposited structure.

Figure 4A:
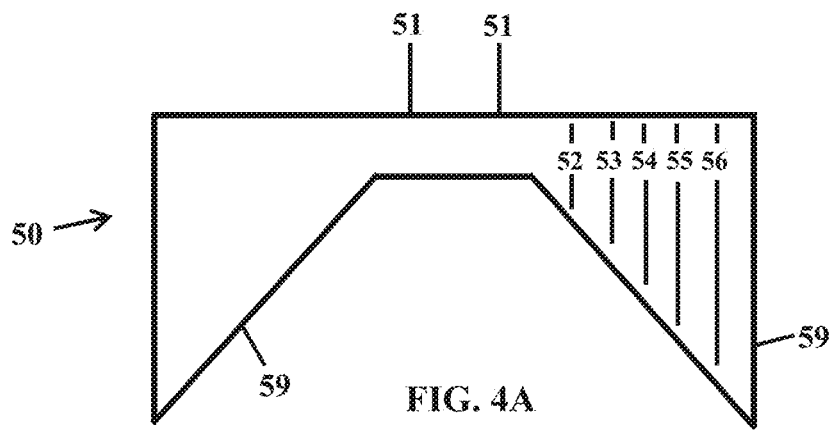
FIGS. 4A and 4B show examples of a deposited structure and representative, approximate concentration data.
Figure 4B:
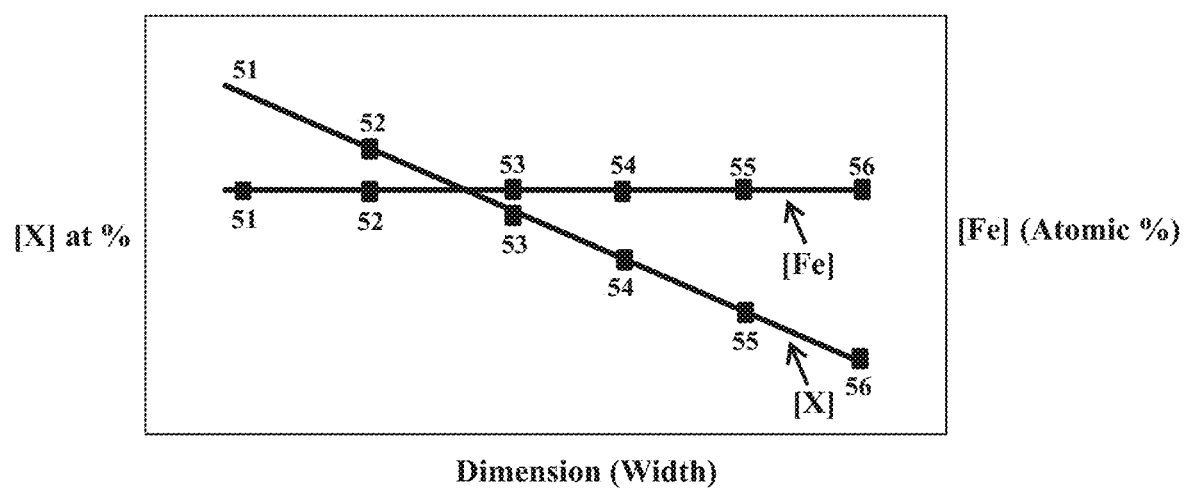

Referring next to FIGS. 4A and 4B, these illustrate the use of feature size (e.g., a dimension in an x-y plane) of a flat deposited structure having a relatively complex shape to control composition of the deposited material of the feature, i.e., the use of feature size for intra-structure control of the composition of features of the structure.

FIG. 4A shows an example of flat deposited structure 50 that has a complicated or irregular shape in an x-y plane. Structure 50 is flat or planar, i.e., has a relatively uniform thickness in the z-direction over its area, and includes narrow segment 51 having a narrow width and a substantially larger length, with narrow segment 51 bridging or connecting two wider segments or portions 59, each of which is disposed at an opposed end of the length of narrow segment 51. Each portion 52, 53, 54, 55, and 56 of the wider segments 59 has an increasing width. Structure 50 was formed on a substrate surface by electrodeposition, using a mask, and using an electrolyte solution that contained iron as a non-diffusion-controlled species and Re as a diffusion-controlled species.

Referring to FIG. 4B, shown is a qualitative description of the concentrations of a diffusion-controlled species X (e.g., Re) over the area of deposited structure 50 (in the x-y plane). As shown, different portions of structure 50 contain different concentrations of a diffusion-controlled species X; i.e., structure 50 exhibits intra-structure differences in a concentration of diffusion-controlled species X. Within the same flat structure, the composition of the deposited material varies over the area of the structure. The variation in composition of the different portions or features of structure 50 is dependent upon and can be controlled by the size features of the irregular shape of structure 50. The concentration of diffusion-controlled species X in the narrow feature, narrow segment 51, can be controlled to be greater than the concentration of species X in features having a larger size feature, e.g., width, including at portions 52, 53, 54, 55, and 56, each of which has a gradually increasing width and a gradually decreasing concentration of species X. Due to a difference in the composition of narrow segment 51 relative to portions 52, 53, 54, 55, and 56, narrow segment 51 can have a property such as a magnetic property that is different from that property at wider portions 52, 53, 54, 55, and 56.

Still referring to FIG. 4B, shown is a qualitative description of concentrations of a non-diffusion-controlled species (e.g., Fe) over the area of deposited structure 50 (in the x-y plane). As shown, different portions of structure 50 contain similar concentrations of a non-diffusion-controlled species (e.g., Fe); i.e., structure 50 exhibits relative intra-structure uniformity in the concentration of the non-diffusion-controlled species. Note that the data of FIG. 4B is approximate and is provided to show a qualitative relationship between a size or shape feature of a deposited material and concentrations of diffusion-controlled and non-diffusion-controlled species.

Figure 5:
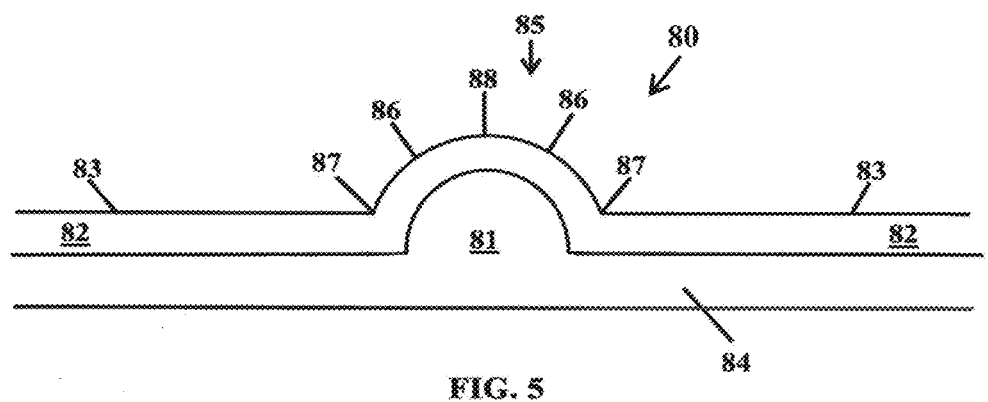
FIG. 5 shows an example of a deposited structure.

Referring next to FIG. 5, illustrated is the use of topography (e.g., a shape in three (x, y, and z) dimensions) of a deposited structure to affect or control the composition of the deposited material of the feature within the deposited structure, i.e., the use of topography for intra-structure control of the composition of features of the structure, specifically with respect to a concentration of a diffusion-controlled species.

FIG. 5 shows an example of a three-dimensional deposited structure 80, of deposited material 82 deposited over three-dimensional metal base structure 84. Specifically, deposited structure 80 may be a line of deposited material 82 extending longitudinally in an x-direction, having a uniform width (not shown) in a y-direction, and having a relatively uniform height or thickness in a z-direction. The line of deposited material 82 includes hemispherical rounded portion 85 formed over a corresponding three-dimensional (hemispherical, in cross-section) bump 81 in three-dimensional metal base structure 84.

Deposited material 82 includes rounded portion 85 and flat portions 83, all of which share a relatively uniform thickness above base 84 in the z-direction, and a relatively uniform width (not shown) in the y-direction. Deposited material 82 is an alloy that includes at least one diffusion controlled metal species (X) and at least one non-diffusion-controlled species. The diffusion-controlled species (X) has a first concentration (reference concentration C) at flat portions 83. Reference concentration C is relatively uniform over flat portions 83 at locations sufficiently distant from rounded portion 85 that the shape of rounded portion 85 does not affect the concentration of the diffusion-controlled species.

At crest 88 of rounded portion 85, the concentration of the diffusion-controlled species is greater than the reference concentration, such as at least double or triple the reference concentration, i.e., 2 C or 3 C. At each of two boundaries 87 that connect a bottom of rounded portion 85 with a flat portions 83, the concentration of the diffusion-controlled species is relatively low, e.g., a fraction of reference concentration C, such as 0.5 C or 0.25 C. At the rounded sidewall regions 86 of rounded portion 85, the concentration of the diffusion-controlled species in deposited material 82 gradually increases, i.e., forms a gradient, from the relatively low concentration at boundary 87 to a maximum concentration at crest 88.

Applicant's determination that a concentration of diffusion-controlled species in a deposited material can be affected by form features of a deposited structure, allows for a variety of useful and advantageous techniques to control a composition of, and thereby a property of, a deposited structure formed onto a substrate by electrodeposition, with the diffusion-controlled species being present in an electrolyte solution of the electrodeposition method in a diffusion-controlling concentration.

In general, a concentration of diffusion-controlled species present in a structure formed by electrodeposition can be controlled by including the diffusion-controlled species in a relatively low amount, with the amount being in a range that can allow for the diffusion-controlled species to be deposited onto a substrate by non-linear diffusion, depending on factors such as a form feature (shape or dimension) of the deposited structure, current density of the process, or other factors that, alone or in combination, affect the form of a diffusion layer at a surface of the substrate and can cause the diffusion layer to have a uniform thickness or a rounded thickness.

The ability to control a composition of a deposited structure, or a portion (feature) of a deposited structure, with respect to a concentration of a diffusion-controlled species, allows one to achieve desirable control over one or more properties of the structure or portion of the structure. In certain example embodiments, a deposited material can be a magnetic material such as NiFeX, CoFeX, CoFeNiX, CoFeXY, NiFeXY, wherein nickel, iron, cobalt, or two or more of these, can be present as non-diffusion-controlled species as the X, Y, or X and Y component. The diffusion-controlled species may X or Y may be: Re, Ir, Os, Pt, W, Ta, Rh, Au, Ag, Cu, Pd, Ru, S, Sb, Sn, P, or O. In other example embodiments, the deposited material may be magnetic NiFeO, NiFe$_X$, CoFe$_X$, CoNiFe$_X$, with iron being present as a diffusion-controlled species. The diffusion-controlled species may be present in an amount to affect a magnetic property such as magnetostriction, anisotropy, damping, or moment. The structure may be, for example, a magnetic shield that includes one or more narrow features that have a narrow dimension (e.g., a small width), and one or more wider portions that have larger dimensions. The concentration of the diffusion-controlled species will be greater in the features with a narrow dimension relative to the concentration of the diffusion-controlled species in a wider features.

By specific examples, a method as described can include selecting a dimension of a feature of an electrodeposited structure, to increase or reduce the concentration of diffusion-limited species in the feature, such as the concentration of iron (Fe) in a magnetic alloy such as NiFe$_X$ or CoFe$_X$, CoNiFe$_X$, or NiFe$_{21.5}$ (permalloy). The structure can have narrow features that will contain relatively higher concentrations of iron, and wider features with relatively lower concentrations of iron. According to Applicant's methods, the composition (e.g., concentration of iron) of deposited materials of the structure can be affected or controlled by selecting the dimensions of individual deposited structure or features, thus to control (tune) a desired property or to provide a desired property gradient. Example properties may be, .e.g., a magnetic moment, damping constant, magnetostriction, etc., which can be caused to vary at locations of the structure along with the concentration of the diffusion-controlled species (e.g., iron).

In alternate embodiments, the concentration of diffusion-controlled species can be varied over a surface of a deposited structure based on a three-dimensional form of the deposited structure. For example, concentrations of diffusion-controlled species can be caused to vary over topographically protruded or recessed features of a deposited structure. A concentration of diffusion-controlled species at different locations of the three-dimensional structure may be controlled based on the dimensions and shape of the three-dimensional structure. The controlled composition of deposited material over a three-dimensional structure, having differences in concentrations over the three-dimensional structure, can be used to produce a deposited structure having a desired and useful property, or property gradient, at desired locations over the area of the three-dimensional structure.

In other specific embodiments, a combination of a two-dimensional mask design and a three-dimensional topographic design may be useful, in combination. A two-dimensional mask design can be intentionally used to control the composition (i.e., concentration of a diffusion-controlled species) of a deposited material over a three-dimensional topographic surface. Combining the effect of three-dimensional variance in composition, with a two-dimensional composition difference (e.g., gradient), allows for a composition and resultant property of a deposited three-dimensional structure to be intentionally controlled along x, y and z dimensions.

With these or any other example methods and deposited structures, process conditions of an electrodeposition step such as current density and current pulsing may additionally be controlled to achieve a desired concentration or concentration gradient of a diffusion-controlled species in a deposited material.

Figure 6A:
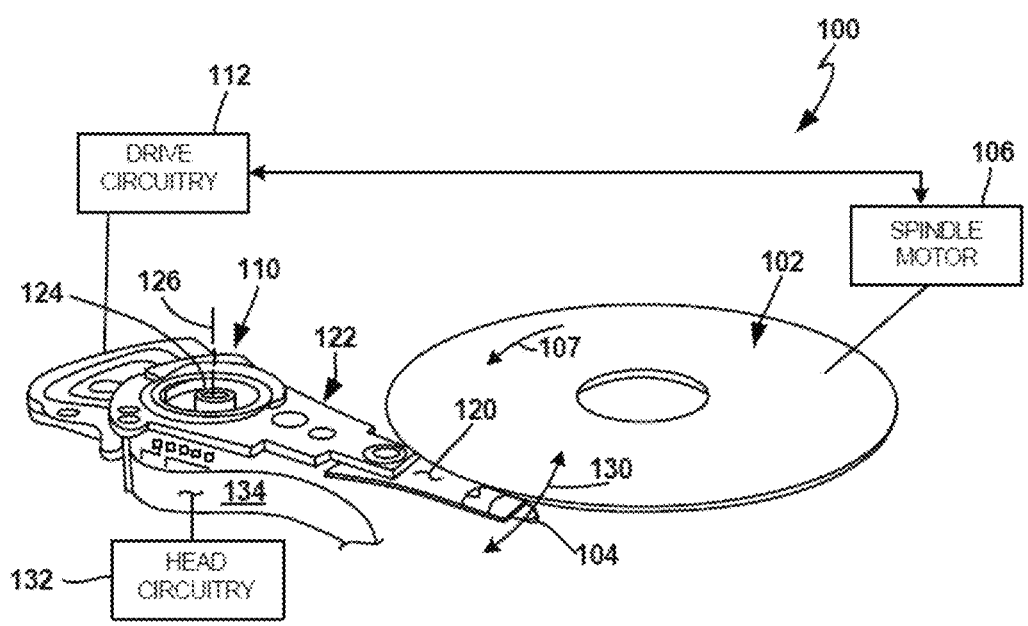
FIGS. 6A and 6B show an example data storage device and magnetic recording components.

FIG. 6A illustrates an example of an environment of use of example types of deposited structure that can be prepared according to the present methods. FIG. 6A is a schematic illustration of a data storage device 100 that includes a data storage medium (hard magnetic disk) 102, and a head 104 for reading data from or writing data to the data storage medium. Head 104 includes one or more transducer elements (not shown in FIG. 6A) that in use are positioned above data storage medium 102. In the embodiment shown, the data storage medium 102 is a rotatable disk or other magnetic storage medium that includes a magnetic storage layer. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). Head 104 is coupled to the actuator mechanism 110 through a suspension assembly that includes a load beam 120 connected to an actuator arm 122 of the mechanism 110 for example through a swage connection.

The one or more transducer elements of head 104 are coupled to head circuitry 132 through flex circuit 134 to encode and decode data. Although FIG. 6A shows a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 6B:
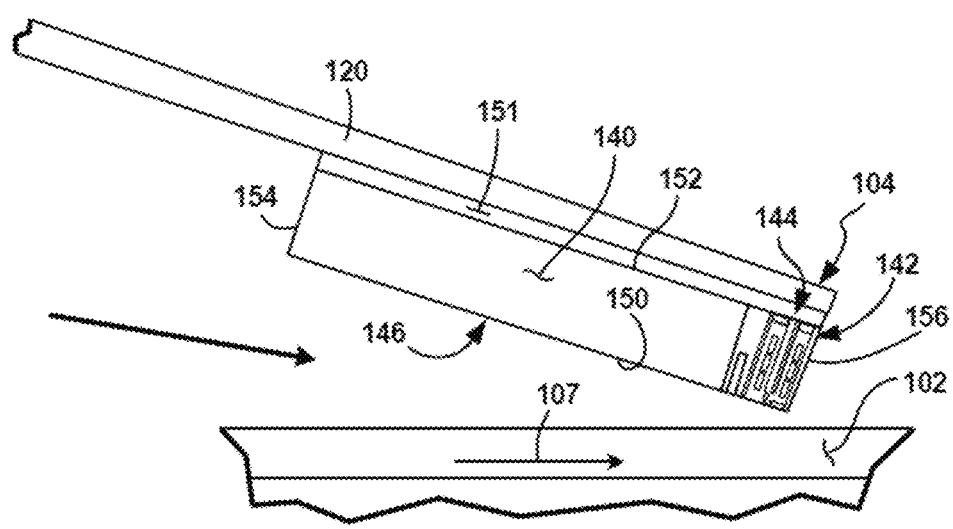

FIG. 6B is a detailed illustration (side view) of the head 104 situated above medium 102. The one or more transducer elements on the head 104 are fabricated on a slider 140 to form a transducer portion 142 of head 104. The transducer portion 142 as illustrated includes write elements encapsulated in an insulating structure to form a write assembly 144 of the head. As shown, head 104 includes a bearing surface (for example, and air bearing surface (ABS)) 146 along a bottom surface 150 of the head or slider facing the medium 102. Head 104 is coupled to load beam 120 through a gimbal spring 151 coupled to a top surface 152 of the head or slider 140 facing away from medium 102.

The ever-increasing levels of recording density in data storage devices such as disk drives produces a continuous need for ever-better write performance which, in turn, has resulted in certain write head designs that may have reliability problems. To address such problems, a high damping material may be included in a shield, a pole, or both, of a write head. A write head that includes a high damping material in a shield, poles, or both is illustrated at FIGS. 7A through 7C.

Figure 7A:
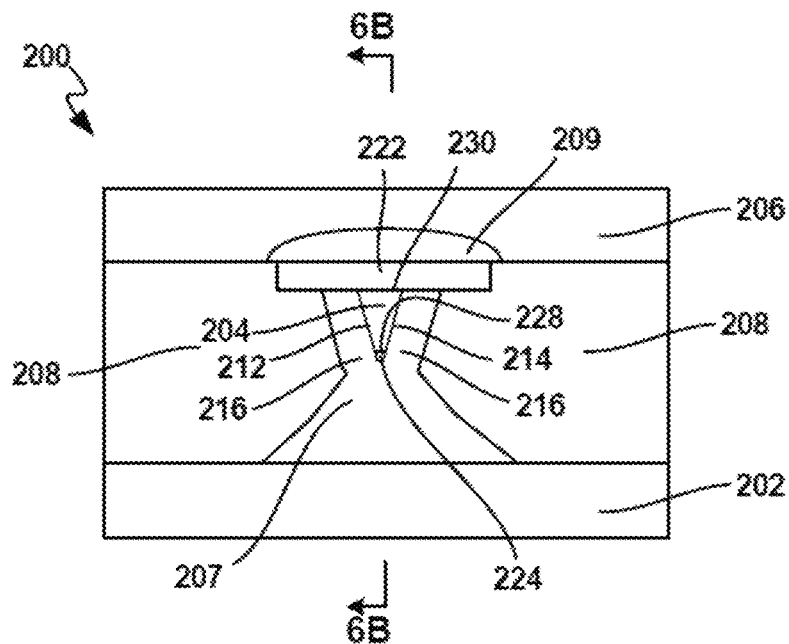
FIGS. 7A, 7B, and 7C show an example magnetic recording transducer or head.
Figure 7B:
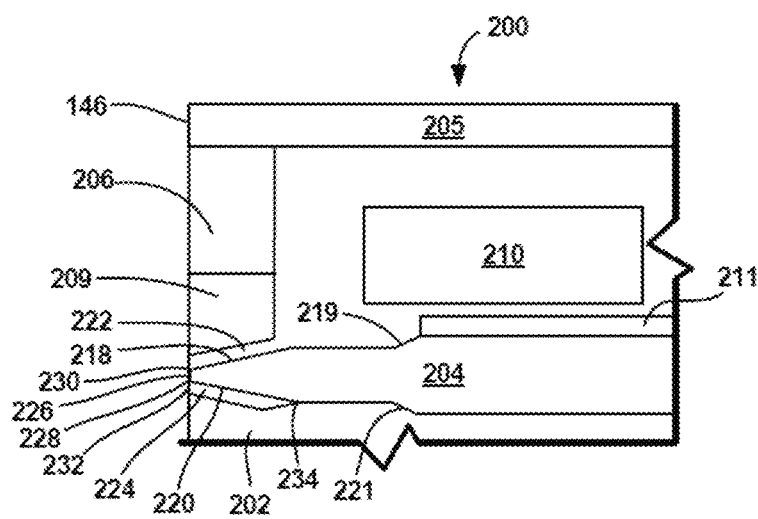
Figure 7C:
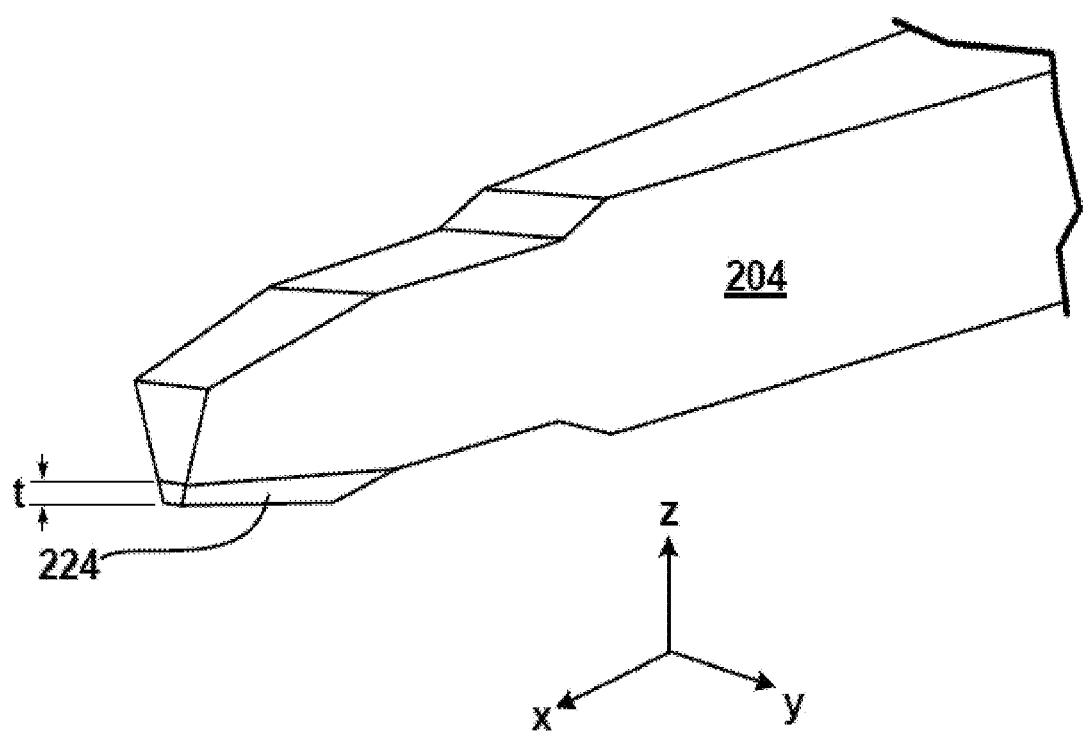

FIGS. 7A, 7B, and 7C depict air bearing surface, side, and perspective views, respectively, of a perpendicular magnetic recording (PMR) transducer or head 200. Transducer 200 may be a part of a merged head including the write transducer 200 and a read transducer (not shown). Alternatively, the magnetic recording head may be a write head only including the write transducer 200. The PMR transducer elements shown in FIGS. 7A, 7B and 7C may be included in a recording head such as recording head 104 of FIGS. 6A and 6B.

The write transducer 200 includes an under-layer/substrate 202, a main pole 204, at least one return pole 205, a trailing edge shield 206, and side shields 208. The under-layer 202 may include multiple structures which are under the pole 204. The write transducer 200 may also include other components including but not limited to coils (denoted by reference numeral 210 in FIG. 7B) for energizing the main pole 204, and a yoke 211.

Main pole 204 resides over under-layer 202 and includes sidewalls 212 and 214. Sidewalls 212 and 214 are separated from the side shields 208 by non-magnetic side shield gaps (SSGs) 216. The top (trailing) surface of the main pole 204 also has a beveled portion 218. The bottom (leading) surface of the main pole 204 may further include a leading surface bevel 220. Additional beveled portions 219 and 221 may also be present behind the bearing surface 146. A trailing shield gap (TSG) 222 is formed between the main pole 204 and the trailing edge shield 206.

The write head 200 further includes a high damping magnetic alloy layer 224 attached to the leading surface bevel 220. Further, side shields 208 may include a high damping material, and portions of trailing edge shield 206 or entire trailing edge 206 may include a high damping material. The high damping magnetic alloy 224 may include a magnetic material (e.g., Permalloy (NiFe), Fe, FeCo) infused with a small percentage of a transition 5d metal such as rhenium (Re), osmium (Os), iridium (Ir), etc., and may be prepared by electrodeposition as described herein. For example, the high damping material layer may be NiFeX, with X being the transition 5d metal having a content between about 1 and about 15 atomic (at) percent (%). A thickness (t in FIG. 7C) of high damping material layer 224 may be between about 10 nanometers (nm) and about 50 nm. In some examples, a thickness of high damping material layer 224 may be more than 50 nm.

Shields 208 may similarly include a magnetic material infused with a small percentage of a transition metal such as rhenium, osmium, iridium, etc., and these may be prepared by electrodeposition according to methods described herein. Such writer shields respond to flux leakage from the write pole 204 in a gentler manner, thereby improving the erasure fields by eliminating peaks. In some examples, shields 208 may be laminated structures with at least one layer of the laminated structure including a small percentage of a transition 5d metal such as rhenium, osmium, iridium, etc., and at least one other layer not including any transition 5d metal. Also, in certain examples, the entirety of trailing edge shield 206, or a portion of trailing edge shield 206 (e.g., portions other than 209), may include a magnetic material infused with a small percentage of a transition 5d metal such as rhenium, osmium, iridium, etc., and may be prepared by an electrodeposition method of the present description.

As can be seen in FIGS. 7A and 7C, at the bearing surface 146, the main pole 204 has a trapezoid shape with a front surface 226 that forms a portion of the bearing surface 146. The front surface 226 has a leading edge 228 and a trailing edge 230. As illustrated, high damping material layer 224 has a front end 232 that is attached to the main pole 204 at the leading edge 228. As shown at FIG. 6B, high damping material layer 224 extends from the front end at the leading edge 228 to a rear end 234 of the leading surface bevel 220. It should be noted that, in different examples, the high damping material may or may not cover the entire leading surface bevel 220.

In the examples described above in connection with FIGS. 6A and 6B, side shields 208 are split (e.g., side shields 208 are not connected below the leading edge or bottom edge 228 of the main pole 204). As can be seen in FIGS. 7A and 7B, the side shields are split by layer 207, which may be a non-magnetic or insulating material.

Figure 8A:
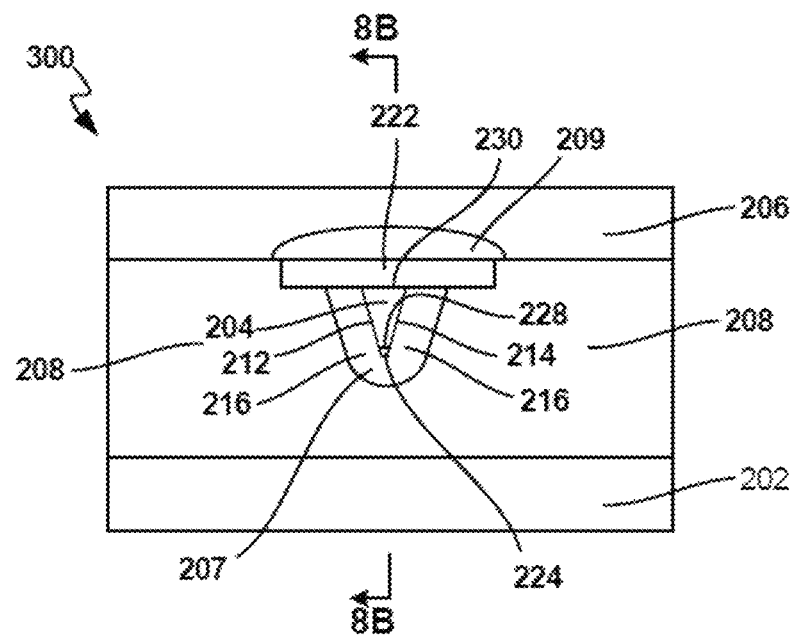
FIGS. 8A and 8B show an example magnetic recording transducer or head.
Figure 8B:
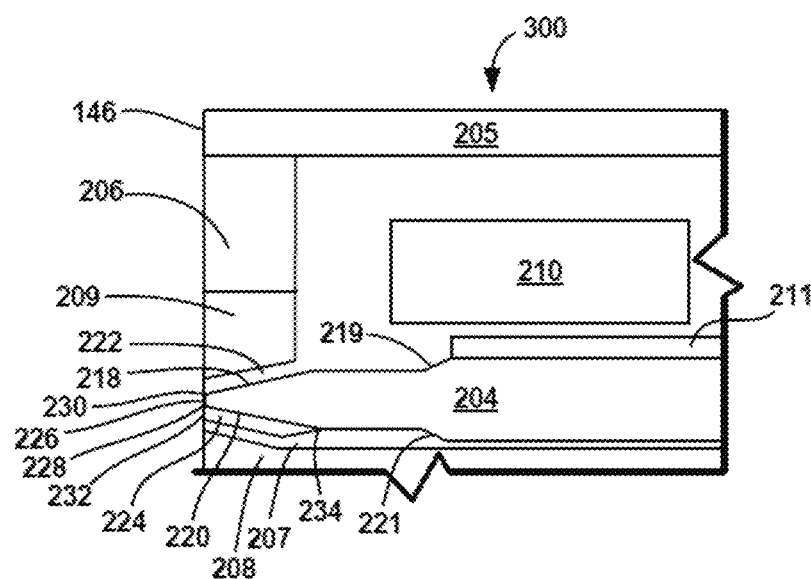

FIGS. 8A and 8B depict air bearing surface and side views, respectively, of a perpendicular magnetic recording (PMR) transducer or head 300 that has a wrap-around shield configuration in accordance with another example. As can be seen in FIG. 8A, side shields 208 are connected below the leading edge or bottom edge 228 of the main pole 204. In the case of the write head 200 (of FIGS. 7A and 7B), write head 300 may include a high damping material layer 224 attached to the leading surface bevel 220. Further, in some examples, connected side shields 208 of write head 300 may include a high damping material prepared by an electrodeposition method of the present description. In still other examples, entire trailing edge shield 206 or a portion of trailing edge shield 206 (e.g., portions other than 209) may include a high damping material prepared by an electrodeposition method of the present description.

As with write head 200 (of FIGS. 7A and 7B), in write head 300, the high damping material layer 224 may extend from the front end at the leading edge 228 to a rear end 234 of the leading surface bevel 220. In different examples, the high damping material may or may not cover the entire leading surface bevel 220. As noted above, in different embodiments, electrodeposition or electroplating as described herein may be used to form the elements with the high damping materials.

The invention claimed is:

1. A method of electrodepositing a deposited structure onto a substrate surface while controlling a concentration of a diffusion-controlled species in the deposited structure, the method comprising:
immersing the substrate in an electrolyte solution comprising one or more diffusion-controlled species and one or more non-diffusion-controlled species,
applying current to the substrate immersed in the electrolyte to cause the diffusion-controlled species and the non-diffusion-controlled species to form a deposited material on the substrate surface as the deposited structure having a concentration of the diffusion-controlled species that is affected by a dimension or shape of the deposited structure, and
selecting a current density of the current, and selecting a concentration of the diffusion-controlled species in the electrolyte solution, to cause diffusion-controlled deposition of the diffusion-controlled species and formation of the deposited structure having a varied length, width, or height dimension, and a concentration of the diffusion-controlled species that varies with the varied length, width, or height dimension,
wherein the deposited structure is a component of a magnetic recording head.

2. A method of claim 1 wherein the current density is in a range from 5 to 50 milliamps per square centimeter.

3. A method of claim 1 wherein the deposited structure has an irregular shape with a varied width along a length, and the deposited structure has a relatively high concentration of the diffusion-controlled species in a portion having the narrow width, and a relatively lower concentration of the diffusion-controlled species in a portion of the deposited structure having a larger width.

4. A method of claim 1 wherein the substrate surface includes a three-dimensional structure, the deposited structure includes a three-dimensional structure, and the concentration of the diffusion-controlled species is different at different locations of the three-dimensional deposited structure.

5. A method of claim 1 wherein the non-diffusion-controlled species is selected from nickel, cobalt, iron, and the diffusion-controlled species is selected from: Re, Ir, Os, Pt, W, Ta, Rh, Au, Ag, Cu, Pd, Ru, P, and O.

6. A method of claim 1 wherein the deposited material is selected from NiFeX, CoFeX, CoFeNiX, CoFeXY, NiFeXY, wherein nickel, iron, cobalt, or combinations of these, are individually present in as non-diffusion-controlled species, and X, Y, or X and Y are present as diffusion-controlled species.

7. A method of claim 1 wherein the deposited material is magnetic NiFeO, NiFe$_x$, CoFe$_x$, or CoNiFe$_x$, with iron being present as a diffusion-controlled species.

8. A method of claim 1 wherein a concentration of the diffusion-controlled species in the electrolyte solution is in a range from 0.001 to about 1 millimolar (mM).

9. A method of claim 8 wherein the component is selected from a pole and a shield.

10. A method of claim 1 wherein
the non-diffusion-controlled species is selected from nickel, cobalt, iron, and a combination thereof; and
the diffusion-controlled species is selected from: Re, Ir, Os, Pt, W, Ta, Rh, Au, Ag, Cu, Pd, Ru, P, and O.

11. A method of claim 1 wherein the non-diffusion-controlled species comprise two or more of nickel, cobalt, and iron.

12. A method of claim 1 wherein the deposited structure has a thickness of less than 50 microns.

13. A method of claim 1, wherein the diffusion-controlled species is present in the electrolyte solution at a concentration that is sufficiently low that the rate of deposition of the diffusion-controlled species is limited by the rate of transport of the diffusion-controlled species through the electrolyte solution.

14. A method of electrodepositing a deposited structure onto a substrate surface, the method comprising:
immersing the substrate in an electrolyte solution comprising one or more diffusion-controlled species and one or more non-diffusion-controlled species, applying current to the substrate immersed in the electrolyte to cause the diffusion-controlled species and the non-diffusion-controlled species to form a deposited material on the substrate surface as the deposited structure having a concentration of the diffusion-controlled species that is affected by a dimension or shape of the structure, wherein:

the deposited structure is a component of a magnetic transducer;

the non-diffusion-controlled species comprise two or more of nickel, cobalt, and iron, and the diffusion-controlled species is selected from: Re, Ir, Os, Pt, W, Ta, Rh, Au, Ag, Pd, Ru, P, and O.

15. A method of claim 14 wherein the magnetic transducer is a perpendicular magnetic recording transducer that comprises a main pole, a return pole, a trailing edge shield, and a side shield, and the deposited structure is a shield.

16. A method of claim 14 wherein the deposited material is selected from NiFeX, CoFeX, CoFeNiX, CoFeXY, NiFeXY, wherein the nickel, iron, cobalt, or a combination thereof are individually present as non-diffusion-controlled species, and X, Y, or X and Y are diffusion-controlled species.

17. A method of claim 14 wherein the diffusion-controlled species is selected from: Re, Ir, Os, Pt, Ta, Rh, Au, Ag, Pd, Ru, P, and O.

18. A method of claim 14 wherein a concentration of the diffusion-controlled species in the electrolyte solution is in a range from 0.001 to about 1 millimolar (mM).

\* \* \* \* \*